United States Patent
Imashiro et al.

(12)

(10) Patent No.: US 6,310,119 B1
(45) Date of Patent: Oct. 30, 2001

(54) FILM-SHAPED ENCAPSULATING AGENT FOR ELECTRONIC PARTS

(75) Inventors: Yasuo Imashiro; Takahiko Ito; Hideshi Tomita; Norimasa Nakamura, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/400,972

(22) Filed: Sep. 22, 1999

(30) Foreign Application Priority Data

Sep. 30, 1998 (JP) .................................................. 10-277438

(51) Int. Cl.⁷ ..................................................... C08L 63/00
(52) U.S. Cl. ............................................................. 523/400
(58) Field of Search ............................................... 523/400

(56) References Cited

U.S. PATENT DOCUMENTS

| | | | |
|---|---|---|---|
| 5,321,101 | * 6/1994 | Suzuki | 525/452 |
| 5,393,839 | * 2/1995 | Iwamoto | 525/111 |
| 5,576,398 | * 11/1996 | Takahashi | 525/528 |
| 5,679,730 | * 10/1997 | Amano | 523/415 |

* cited by examiner

*Primary Examiner*—Paul R. Michl
(74) *Attorney, Agent, or Firm*—Kubovcik & Kubovcik

(57) ABSTRACT

The present invention provides a film-shaped encapsulating agent for electronic parts which is composed essentially of a polycarbodiimide resin and an epoxy resin or of a polycarbodiimide resin, an epoxy resin and colorant, wherein the polycarbodiimide resin has a polystyrene-reduced number-average molecular weight of 3,000 to 50,000 as determined by gel permeation chromatography and the epoxy resin is contained in a proportion of 20 to 150 parts by weight per 100 parts by weight of the polycarbodiimide resin. The film-shaped encapsulating agent enables, for its good processability, the continuous encapsulation of electronic parts without requiring any expensive apparatus (therefore, no cost increase is incurred) and is excellent in heat resistance and electrical insulation after the encapsulation.

5 Claims, No Drawings

FILM-SHAPED ENCAPSULATING AGENT FOR ELECTRONIC PARTS

BACKGROUND OF THE INVENTION (1) Field of the Invention

The present invention relates to a film-shaped encapsulating agent for electronic parts, more particularly to a film-shaped encapsulating agent for electronic parts which enables the continuous encapsulation of electronic parts without requiring any expensive apparatus because of good processability (therefore, no cost increase is incurred) and is excellent in heat resistance and electrical insulation after the encapsulation.

(2) Description of the Prior Art

In general, various electronic parts are often encapsulated with various materials at the final production step in order to avoid the bad influence of moisture, dust and the like in air. Such encapsulation of electronic parts have heretofore been carried out, for example, by encapsulation with a thermosetting resin by transfer molding, or by placing an electronic part in a box-shaped pot, and then pouring a resin into the pot to encapsulate the part (potting method), or by using, as an encapsulating agent, a film obtained by coating a substrate such as cellulose or the like with a B-stage resin (for example, epoxy resin).

However, in the encapsulation with a thermosetting resin by transfer molding, a high cost is incurred because an expensive transfer-molding machine and an expensive mold must be used. In the potting method, continuous operation is difficult and hence the number of operational steps is large, the maintenance of quality is hence difficult and, in addition, the preparation of a pot is necessary; therefore, a high cost is incurred. In the method using a film obtained by coating the above-mentioned substrate with a B-stage resin, the film has a short life because the resin is in the B-stage and, moreover, the maintenance of quality is difficult.

SUMMARY OF THE INVENTION

The present invention aims at overcoming the above-mentioned problems of the prior art and providing a film-shaped encapsulating agent for electronic parts which enables the continuous encapsulation of electronic parts without requiring any expensive apparatus because of good processability (therefore, no cost increase is incurred) and is excellent in heat resistance and electrical insulation after the encapsulation.

According to the present invention, there is provided, a film-shaped encapsulating agent for electronic parts which is composed essentially of a polycarbodiimide resin and an epoxy resin, wherein the polycarbodiimide resin has a polystyrene-reduced number-average molecular weight of 3,000 to 50,000 as determined by gel permeation chromatography and the epoxy resin is contained in a proportion of 20 to 150 parts by weight per 100 parts by weight of the polycarbodiimide resin, or a film-shaped encapsulating agent which is composed essentially of a polycarbodiimide resin, an epoxy resin and a colorant, wherein the polycarbodiimide resin has a polystyrene-reduced number-average molecular weight of 3,000 to 50,000 as determined by gel permeation chromatography and the epoxy resin is contained in a proportion of 20 to 150 parts by weight per 100 parts by weight of the polycarbodiimide resin.

DETAILED DESCRIPTION OF THE INVENTION

The present invention is explained in detail below.

In the first case, the film-shaped encapsulating agent for electronic parts of the present invention is composed essentially of a polycarbodiimide resin and an epoxy resin. As this polycarbodiimide resin, there can be used those produced by various methods. There can be used isocyanate-terminated polycarbodiimides produced fundamentally by the conventional method for producing a polycarbodiimide [U.S. Pat. No. 2,941,956; JP-B-47-33,279; J. Org. Chem., 28, 2069–2075 (1963); Chemical Review 1981, Vol. 81, No. 4, pages 619–621], specifically by the carbon dioxide removal and condensation reaction of an organic polyisocyanate.

In the above-mentioned method, as the organic polyisocyanate which is the starting material for synthesizing the polycarbodiimide compound, there can be used, for example, aromatic polyisocyanates, aliphatic polyisocyanates, alicyclic polyisocyanates and mixtures thereof, and specifically, there can be mentioned 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylp henyl diisocyanate, and 1,3,5-triisopropylbenzene-2,4-diisocyana te.

Among them, those obtained from at least one aromatic polyisocyanate are preferable as the polycarbodiimide resin to be used in the present invention. Incidentally, the aromatic polyisocyanate refers to an isocyanate having, in the, molecule, at least two isocyanate groups bonded directly to the aromatic ring.

As the above-mentioned polycarbodiimide, there can also be used those polycarbodiimides whose terminals are blocked with a compound (e.g. a monoisocyanate) reactive with the terminal isocyanates of polycarbodiimide and whose polymerization degrees are controlled at an appropriate level.

As the monoisocyanate for blocking the terminals of polycarbodiimide to control the polymerization degree thereof, there can be mentioned, for example, phenyl isocyanate, tolylene isocyanate, dimethylphenyl isocyanate, cyclohexyl isocyanate, butyl isocyanate, and naphthyl isocyanate.

As the other compounds reactive with the terminal isocyanates of polycarbodiimide, there can be used, for example, aliphatic compounds, aromatic compounds or alicyclic compounds having —OH group (such as methanol, ethanol, phenol, cyclohexanol, N-methylethanolamine, polyethylene glycol monomethyl ether, polypropylene glycol monomethyl ether and the like), =NH group (such ad diethylamine, dicyclohexylamine and the like), —NH$_2$ group (such as butylamine, cyclohexylamine and the like), —COOH group (such as propionic acid, benzoic acid, cyclohexanecarboxylic acid and the like), —SH group (such as ethylmercaptan, allylmercaptan, thiophenol and the like), epoxy group, or the like.

The carbon dioxide removal and condensation reaction of the above organic polyisocyanate proceeds in the presence of a carbodiimidation catalyst. As the carbodiimidation catalyst, there can be used, for example, phosphorene oxides such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, 3-phosphorene isomers thereof, and the like. Among them, 3-methyl-1-phenyl-2-phosphorene-1-oxide is suitable from the standpoint of reactivity.

The polycarbodiimide resin used in the present invention has a polystyrene-reduced number-average molecular weight of 3,000 to 50,000, preferably 10,000 to 30,000, and more preferably 15,000 to 25,000, as measured by gel permeation chromatography (GPC) regardless of whether or not the above-mentioned terminal-blocking agent is used. When the number-average molecular weight is smaller than 3,000, no sufficient film-formability or heat resistance can be obtained. When the number-average molecular weight exceeds 50,000, a long period of time is required for the synthesis of polycarbodiimide resin and, in addition, the polycarbodiimide resin varnish obtained has an extremely short pot life (service life). Therefore, such number-average molecular weights are not practical.

As the epoxy resin used in the present invention, there can be mentioned epoxy resins having at least two epoxy groups in the molecule, for example, glycidyl ether type epoxy resins, representatives of which are bisphenol A type epoxy resins, bisphenol F type epoxy resins, phenolic novolac type epoxy resins and cresol novolac type epoxy resins; alicyclic epoxy resins; glycidyl ester type epoxy resins; heterocyclic epoxy resins; and liquid rubber-modified epoxy resins. They are used alone or in admixture of two or more. Preferable are bisphenol A type epoxy resins, bisphenol F type epoxy resins, phenolic novolac type epoxy resins and cresol novolac type epoxy resins. However, the epoxy resins used in the present invention are not limited to them and all generally known epoxy resins may be used.

In the second case, the film-shaped encapsulating agent of the present invention is composed essentially of a polycarbodiimide resin, an epoxy resin and a colorant. This colorant is for coloring the encapsulating agent, thereby preventing the internal element of electronic part, particularly the semiconductor, from erroneously working owing to light, or for opacifying the encapsulating agent, thereby allowing the encapsulated electronic part to have a function of a so-called black box.

As specific examples of the above colorant, carbon black and titanium oxide can be mentioned.

In the present invention, the proportions of the polycarbodiimide resin and the epoxy resin used are 100 parts by weight for the former and 20 to 150 parts by weight, preferably 40 to 130 parts by weight, more preferably 50 to 100 parts by weight for the latter. When the proportion of the epoxy resin is smaller than 20 parts by weight, no sufficient heat resistance is obtained. When the proportion of the epoxy resin exceeds 200 parts by weight, the mixed resin shows inferior film-formability. Therefore, neither of such proportions is not desirable.

When the colorant is used, it is necessary to use the same in such an amount that the physical properties of the resulting encapsulating agent are not adversely affected. The specific amount of the colorant used is 0.01 to 5% by weight, preferably 0.3 to 2% by weight, based on the total weight of the polycarbodiimide resin and the epoxy resin. Incidentally, when the amount of the colorant used is smaller than 0.01% by weight, the addition effect of the colorant appears hardly. When the amount exceeds 5% by weight, the insulating property of the resulting film is adversely affected in some cases.

The film-shaped encapsulating agent for electronic parts of the present invention is characterized by having a film shape. In obtaining the film-shaped encapsulating agent of the present invention from the polycarbodiimide resin and the epoxy resin or from the polycarbodiimide resin, the epoxy resin and the colorant, these components are first mixed. This mixing step is not critical. For example, the above components may be mixed at room temperature or with heating, or the epoxy resin may be dissolved in a suitable solvent and then mixed with the other component or components.

For forming a mixture of the polycarbodiimide resin and the epoxy resin or a mixture of the polycarbodiimide resin, the epoxy resin and the colorant into a film, it is sufficient to, for example, cast this mixture by a coater on a polyethylene terephthalate (PET) film which has been subjected to a treatment for easy release and then remove the solvent by heating. However, this method is not critical.

Incidentally, the term "film-shaped" used herein means a film having a thickness of approximately 10 to 500 $\mu$m.

In order to encapsulate an electronic part with the film-shaped encapsulating agent of the present invention obtained as mentioned above, it is sufficient to laminate this film-shaped encapsulating agent to the electronic part and then heat and cure the agent. The film-shaped encapsulating agent of the present invention is flexible at room temperature, becomes more flexible when heated lightly, and is cured as such when heated strongly. Therefore, by utilizing these properties, electronic parts can be encapsulated efficiently.

DESCRIPTION OF THE PREFERRED EMBODIMENTS

The present invention is described in more detail below by way of Examples.

EXAMPLE 1

In a reactor equipped with a stirrer and a condenser were placed 172 g of 4,4'-diphenylmethane diisocyanate (referred to hereinafter as MDI), 1.64 g of phenyl isocyanate (referred to hereinafter as PI), 1,290 g of tetrahydrofuran (referred to hereinafter as THF) as a solvent and 0.34 g of 3-methyl-1-phenyl-2-phosphorene-1-oxide as a catalyst, and they were subjected to a reaction at 70° C. for 15 hours, to obtain a varnish of a polycarbodiimide having a number-average molecular weight (referred to hereinafter as Mn) of $2.0 \times 10^4$ (polystyrene-reduced value) as determined by GPC. To this varnish were added an epoxy resin [Epikote 828 (trade name), a product of Yuka Shell Epoxy K. K.] in a proportion of 70 parts by weight per 100 parts by weight of the resin content of the varnish and carbon black [CARBON BLACK #40 (trade name), a product of Mitsubishi Chemical Corp.] as a colorant in a proportion of 0.75% by weight based on the total resin content, and they were mixed with stirring. The varnish thus obtained was cast on a PET film which had been subjected to a treatment for easy release, dried and then peeled to obtain a film-shaped encapsulating agent having a thickness of 450 $\mu$m.

EXAMPLE 2

The same procedure as in Example 1 was repeated except that the amount of PI was changed to 6.56 g. Incidentally, the Mn of the polycarbodiimide obtained was $6.2 \times 10^3$.

EXAMPLE 3

The same procedure as in Example 1 was repeated except that the epoxy resin [Epikote 828 (trade name), a product of Yuka Shell Epoxy K. K.] was added in a proportion of 100 parts by weight per 100 parts by weight of the resin content of the polycarbodiimide varnish.

EXAMPLE 4

In a reactor equipped with a stirrer and a condenser were placed 172 g of MDI, 1.23 g of PI, 1,290 g of THF as a solvent and 0.34 g of 3-methyl-1-phenyl-2-phosphorene-1-oxide as a catalyst and the resulting mixture was subjected to a reaction at 70° C. for 19 hours to obtain a varnish of a polycarbodiimide having a number-average molecular weight (Mn) of $3.1 \times 10^4$ (polystyrene-reduced value) as determined by GPC. To this varnish were added an epoxy resin [Epikote 828 (trade name), a product of Yuka Shell Epoxy K. K.] in a proportion of 120 parts by weight per 100 parts by weight of the resin content of the varnish and carbon black [CARBON BLACK #40 (trade name), a product of Mitsubishi Chemical Corp.] as a colorant in a proportion of 0.75% by weight based on the total resin content, and they were mixed with stirring. The varnish thus obtained was cast on a PET film which had been subjected to a treatment for easy release, dried and then peeled to obtain a film-shaped encapsulating agent having a thickness of 450 μm.

EXAMPLE 5

In a reactor equipped with a stirrer and a condenser were placed 174 g of a 80:20 (by weight) mixture of 2,4'-tolylen e diisocyanate and 2,6'-tolylene disocyanate, 1.79 g of PI, 1,200 g of toluene as a solvent and 0.34 g of 3-methyl-1-phenyl2-phosphorene-1-oxide as a catalyst, and the resulting mixture was subjected to a reaction at 100° C. for 14 hours to obtain a varnish of a polyearbodiimide having a number average molecular weight (Mn) of $1.6 \times 10^4$ (polystyrene-reduced value) as determined by GPC. To this varnish were added an epoxy resin [Epikote 828 (trade name), a product of Yuka Shell Epoxy K. K.] in a proportion of 50 parts by weight per 100 parts by weight of the resin content of the varnish and carbon black [CARBON BLACK #40 (trade name), a product of Mitsubishi Chemical Corp.] as a colorant in a proportion of 0.75% by weight based on the total resin content, and they were mixed with stirring to obtain a varnish. This varnish was cast on a PET film which had been subjected to a treatment for easy release, dried and then peeled to obtain a film-shaped encapsulating agent having a thickness of 450 μm.

COMPARATIVE EXAMPLE 1

The same procedure as in Example 1 was repeated except that the amount of Epikote 828 added was changed to 200 parts by weight per 100 parts by weight of the polycarbodiimide resin.

COMPARATIVE EXAMPLE 2

Into a reactor equipped with a stirrer and a condenser were fed 200 g of MDI, 2,308 g of PI, 1,720 g of THF and 0.44 g of 3-methyl-1-phenyl-2-phosphorene-1-oxide as a catalyst, and the resulting mixture was subjected to a reaction under refluxing for 10 hours to obtain a varnish of a polycarbodiimide having a number-average molecular weight (Mn) of $1.9 \times 10^3$ (polystyrene-reduced value) as determined by GPC. To this varnish were added an epoxy resin [Epikote 828 (trade name), a product of Yuka Shell Epoxy K. K.] in a proportion of 70 parts by weight per 100 parts by weight of the resin content of the varnish and carbon black [CARBON BLACK #40 (trade name), a product of Mitsubishi Chemical Corp.] as a colorant in a proportion of 0.75% by weight based on the total resin content, and they were mixed with stirring to obtain a varnish. This varnish was cast on a PET film which had been subjected to a treatment for easy release, dried and then peeled to obtain a film-shaped encapsulating agent having a thickness of 450 μm.

COMPARATIVE EXAMPLE 3

In a reactor equipped with a stirrer and a condenser were placed 172 g of MDI, 1.64 g of PI, 1,290 g of THF as a solvent and 0.34 g of 3-methyl-1-phenyl-2-phosphorene-1-oxide as a catalyst, and the resulting mixture was subjected to a reaction at 70° C. for 15 hours to obtain a varnish of a polycarbodiimide having a number-average molecular weight (Mn) of $2.0 \times 10^4$ (polystyrene-reduced value) as determined by GPC. To this varnish was added carbon black [CARBON BLACK #40 (trade name), a product of Mitsubishi Chemical Corp.] as a colorant in a proportion of 0.75% by weight based on the total resin content, and they were mixed with stirring. The resulting mixture was cast on a PET film which had been subjected to a treatment for easy release, dried and then peeled to obtain a film-shaped encapsulating agent having a thickness of 450 μm.

COMPARATIVE EXAMPLE 4

To 100 parts by weight of an epoxy resin (Epikote 828) were added 10 parts,by weight of dicyandiamide, 30 parts by weight of methyl ethyl ketone, 20 parts by weight of dimethylformamide and carbon black [CARBON BLACK #40 (trade name), a product of Mitsubishi Chemical Corp.] in a proportion of 0.75% by weight based on the total solid content, and they were mixed with stirring to obtain a varnish. This varnish was cast on a PET film which had been subjected to a treatment for easy release, dried and then peeled to obtain an adhesive film having a thickness of 450 μm.

The films obtained in the Examples and the Comparative Examples were evaluated by the following evaluation methods.

(1) Heat Resistance

The films prepared in the Examples and the Comparative Examples were subjected to a heat treatment at 250° C. for 15 minutes and then measured for glass transition point using Rheolograph Solid (a product of Toyo Seiki K. K.). The peak top of tan δ obtained using a temperature-elevating rate of 5° C./min and a frequency of 10 Hz was taken as the glass transition point (Tg) of each film.

(2) Resistance

Using 4239A High Resistance Meter (a product of Yokogawa Hewlett-Packard K. K.), the films prepared in the Examples and the Comparative Examples were measured for surface resistance and volume resistance according to JIS C 6481.

(3) Soldering Heat Resistance after Moisture Absorption

A resistor element was sandwiched in between two sheets of each of the films prepared in the Examples and the Comparative Examples, and the resulting sandwich was molded under the conditions of 170° C. for 5 minutes under 40 kg/cm² and thereafter postcured at 250° C. for 15 minutes. The resulting material was allowed to stand in an atmosphere of 85° C./85% RH for 24 hours, and then immersed in a solder bath at 250° C. for 30 seconds, after which the number of cracked packages/total package number was determined.

(4) Processability

Each of the films prepared in the Examples and the Comparative Examples was cut into a size of 15 cm×15 cm and placed in a mold so as to cover the bottom. 10 metal bars having a diameter of 1 mm were placed thereon in parallel at intervals of about 1 cm, after which the same 15 cm×15 cm film as used for covering the mold bottom was placed on the metal bars so that all the metal bars were covered with the latter film. Thereafter, the resulting assembly was molded under the conditions of 170° C. for 5 minutes under 40 kg/cm$^2$ and then postcured at 250° C. for 15 minutes to finish the curing reaction. Thereafter, the cured product was cut vertically to the metal bars and the adhesion between the metal bar and the resin at the cutting portion was examined using a microscope, to determine the number of complete-adhesion samples/total sample number.

The results of the above measurements are shown in Table 1.

TABLE 1

|  | Heat resistance (° C.) | Surface resistance (Ω) | Volume resistance (Ω · cm) | Soldering heat resistance after moisture absorption | Processability |
|---|---|---|---|---|---|
| Example 1 | >250 | >10$^{15}$ | >10$^{16}$ | 0/20 | 10/10 |
| Example 2 | >250 | >10$^{15}$ | >10$^{16}$ | 0/20 | 10/10 |
| ExamPle 3 | >250 | >10$^{15}$ | >10$^{16}$ | 0/20 | 10/10 |
| Example 4 | >250 | >10$^{15}$ | >10$^{16}$ | 0/20 | 10/10 |
| Example 5 | >250 | >10$^{15}$ | >10$^{16}$ | 0/20 | 10/10 |
| Comp. Ex. 1 | 170 | 4 × 10$^{14}$ | 2 × 10$^{15}$ | 8/20 | 7/10 |
| Comp. Ex. 2 | 180 | >10$^{15}$ | >10$^{16}$ | 5/20 | 6/10 |
| Comp. Ex. 3 | 225 | >10$^{15}$ | >10$^{16}$ | 2/20 | 0/10 |
| Comp. Ex. 4 | 205 | >10$^{15}$ | >10$^{16}$ | 10/20 | 0/10 |

As is clear from the Examples and the Comparative Examples, the film-shaped encapsulating agent for electronic parts of the present invention has good processability, and enables the continuous encapsulation of electronic parts without requiring any expensive apparatus, whereby a low cost is achieved.

Moreover, the electronic parts encapsulated with the film-shaped encapsulating agent of the present invention are excellent in soldering heat resistance and electrical insulation owing to the characteristics of the polycarbodiimide used in the present encapsulating agent.

What is claimed is:

1. A film-shaped encapsulating agent for electronic parts composed essentially of a polycarbodiimide resin and an epoxy resin, wherein the polycarbodiimide resin has a polystyrene-reduced number-average molecular weight of 10,000 to 30,000 as determined by gel permeation chromatography and is obtained by carbon dioxide removal and condensation reaction of an organic polyisocyanate in the presence of tetrahydrofuran or toluene as a solvent and the epoxy resin is contained in a proportion of 20 to 150 parts by weight per 100 parts by weight of the polycarbodiimide resin.

2. A film-shaped encapsulating agent for electronic parts composed essentially of a polycarbodiimide resin, an epoxy resin and a colorant, wherein the polycarbodiimide resin has a polystyrene-reduced number-average molecular weight of 10,000 to 30,000 as determined by gas permeation chromatography and is obtained by carbon dioxide removal and condensation reaction of an organic polyisocyanate in the presence of tetrahydrofuran or toluene as a solvent and the epoxy resin is contained in a proportion of 20 to 150 parts by weight per 100 parts by weight of the polycarbodiimide resin.

3. A film-shaped encapsulating agent for electronic parts according to claim 1, wherein the polycarbodiimidle resin is one obtained from at least one aromatic polyisocyanate.

4. A film-shaped encapsulating agent for electronic parts according to claim 2, wherein the colorant is carbon black.

5. A film-shaped encapsulating agent for electronic parts according to claim 2, wherein the polycarbodiimide resin is one obtained from at least one aromatic polyisocyanate.

* * * * *